(12) United States Patent
Yamamoto et al.

(10) Patent No.: US 7,591,206 B2
(45) Date of Patent: Sep. 22, 2009

(54) STOPPER APPARATUS AND ROBOT

(75) Inventors: Hideo Yamamoto, Fukuoka (JP);
Hiroshi Asano, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 5 days.

(21) Appl. No.: 11/069,548

(22) Filed: Mar. 2, 2005

(65) Prior Publication Data
US 2005/0204849 A1 Sep. 22, 2005

(30) Foreign Application Priority Data
Mar. 2, 2004 (JP) ............ P.2004-057759

(51) Int. Cl.
*B25J 17/00* (2006.01)
*G05G 1/04* (2006.01)

(52) U.S. Cl. ............ 74/490.01; 74/526; 901/27

(58) Field of Classification Search ............ 74/490.05, 74/490.01, 490.06, 490.02, 490.03, 490.04, 74/526, 527; 192/116.5, 149, 148, 139; 901/27–29
See application file for complete search history.

(56) References Cited

U.S. PATENT DOCUMENTS

| | | | | |
|---|---|---|---|---|
| 3,012,447 A | * | 12/1961 | Wallace .................. | 74/526 |
| 3,868,746 A | * | 3/1975 | Dobrjanskyj et al. .......... | 16/390 |
| 4,751,986 A | * | 6/1988 | Takahashi .................. | 188/85 |
| 4,779,149 A | * | 10/1988 | Watanabe ................ | 360/78.13 |
| 4,890,713 A | * | 1/1990 | Pagano .................... | 192/142 R |
| 5,113,107 A | * | 5/1992 | Atsumi et al. .............. | 310/256 |

FOREIGN PATENT DOCUMENTS

| | | |
|---|---|---|
| JP | 07-136972 A | 5/1995 |
| JP | 10-100091 A | 4/1998 |
| JP | 10-225890 A | 8/1998 |
| JP | 2003-205488 A | 7/2003 |

OTHER PUBLICATIONS

Spectrapult webpage, http://acs.chem.ku.edu/carnival2000/Activities/spectrapult.asp, Figure 3, originally published on Jun. 18, 2003.*
Japanese Office Action dated Sep. 12, 2008.

* cited by examiner

*Primary Examiner*—Richard W L Ridley
*Assistant Examiner*—James Pilkington
(74) *Attorney, Agent, or Firm*—Sughrue Mion, PLLC

(57) ABSTRACT

A mechanical stopper offers a relative rotation range exceeding 360°, scarcely generating abrasion powder and the like and having a simple structure. The stopper apparatus has a rotation axis section in which relative rotation is carried out between two members around one rotation axis, for restricting the rotation angle of one of the members with respect to the other member. The stopper apparatus has a contact piece provided on the member and two support members and are provided standing on the other member with a clearance therebetween. A band-shaped elastic member is layered across between the above-mentioned two support members, and the contact piece contacts the elastic member to stop the rotation of the member.

3 Claims, 3 Drawing Sheets

STOPPER APPARATUS AND ROBOT

CROSS-REFERENCE TO RELATED APPLICATION

This application claims priority under 35 USC 119 from Japanesse Patent Application No. 2004-057759, the disclosure of which is incorporated by reference herein.

BACKGROUND OF THE INVENTION

The present invention relates to a stopper apparatus, provided in a rotation axis section wherein a relative rotation is carried out between two members around one rotation axis, for restricting the rotation angle of one member with respect to the other member. The present invention also relates to a robot equipped with the above-mentioned stopper apparatus.

At a rotation axis section wherein a relative rotation is carried out between two members around one rotation axis, for example, at the connection section between the base section and the rotary drum, at the connection section between the rotary drum and the arm section and at the connection section between an arm section and another arm section of an industrial robot, the relative rotation between the two members is required to be restricted in a constant range. This is because if the relative rotation is allowed infinitely, the wiring or piping extended between the above-mentioned two members are twisted excessively and damaged. This kind of restriction is usually accomplished by using hardware or software of a controller. However, a mechanical stopper is required to prevent machine damage from overspeed owing to trouble, such as runaway of a controller. Furthermore, a relative rotation of 360° or more is required occasionally in uses of the above-mentioned industrial robot. Hence, a mechanical stopper for restricting the relative rotation between the above-mentioned two members in a range exceeding 360° is necessary.

Patent Document 1 or Patent Document 2 discloses a mechanical stopper comprising a first engagement piece secured to a rotary member and a second engagement piece installed on a stationary member so as to be freely slidable in a constant range, wherein when the above-mentioned first engagement piece makes contact with the above-mentioned second engagement piece, the above-mentioned first and second engagement pieces are integrated and move in a constant range and then stop, whereby a relative rotation range exceeding 360° is offered.

[Patent Document 1]

Unexamined Japanese Patent Application Publication No. Hei07-136972

[Patent Document 2]

Unexamined Japanese Patent Application Publication No. Hei10-225890

However, the above-mentioned mechanical stopper has the following problems. Since it has a sliding section, there is a danger of generating abrasion powder, whereby the mechanical stopper is not suited for robots requiring cleanness, such as robots for use in semiconductor production. In addition, even in a case where grease or the like is used at the sliding section to avoid abrasion, if gas evaporating from grease or the like pollutes clean environments, problems will occur. Furthermore, the number of components is large, and a great amount of time and effort is required for assembly, thereby causing a problem in raising production costs.

SUMMRY OF THE INVENTION

In consideration of these problems, the present invention is intended to provide a mechanical stopper offering a relative rotation range exceeding 360°, scarcely generating abrasion powder and the like and having a simple structure.

For the purpose of solving the above-mentioned problems, the present invention is configured as described below.

An invention set forth in Aspect 1 comprises a first member, two support members provided on the above-mentioned first member with a clearance therebetween, an elastic member supported between the above-mentioned two support members, a second member relatively rotating with respect to the above-mentioned first member, and a contact piece, provided on the above-mentioned second member, for stopping the relative rotation of the above-mentioned second member by making contact with the above-mentioned elastic member.

An invention set forth in Aspect 2 is characterized in that the above-mentioned elastic member is an endless belt extended between the above-mentioned two support members.

An invention set forth in Aspect 3 is characterized in that the above-mentioned endless belt is a timing belt.

An invention set forth in Aspect 4 is characterized in that the above-mentioned elastic member is a band-shaped rubber plate.

An invention set forth in Aspect 5 is characterized in that the above-mentioned rubber plate is held and secured in grooves respectively formed in the above-mentioned two support members.

An invention set forth in Aspect 6 comprises a first member, two support members provided on the above-mentioned first member with a clearance therebetween, a thin metal plate provided between the above-mentioned two support members, a second member relatively rotating with respect to the above-mentioned first member, and a contact piece, provided on the above-mentioned second member, for stopping the relative rotation of the above-mentioned second member by making contact with the above-mentioned thin metal plate.

An invention set forth in Aspect 7 comprises a first member, two support members provided on the above-mentioned first member with a clearance therebetween, hinges respectively provided on the two support members, a thin metal plate, both ends of which are rotatably supported by the above-mentioned hinges, a second member relatively rotating with respect to the above-mentioned first member, and a contact piece, provided on the above-mentioned second member, for stopping the relative rotation of the above-mentioned second member by making contact with the above-mentioned thin metal plate.

Inventions. set forth in Aspects 8 to 14 are robots equipped with the above-mentioned stopper apparatuses.

DETAILED DESCRIPTION OF THE PREFERRED EMBODIMENTS

Figure 1:
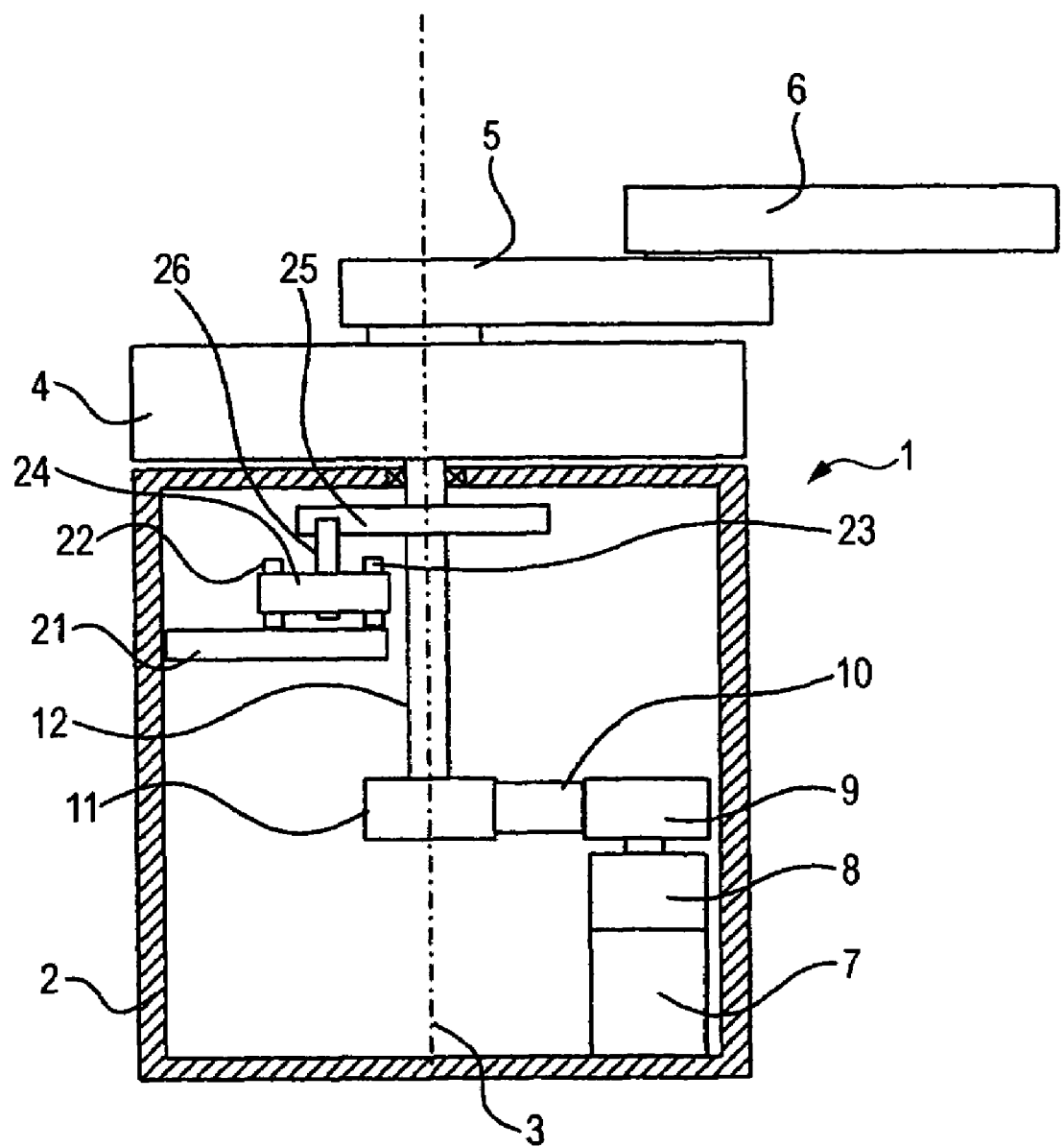
FIG. 1 is a conceptual view showing a robot in accordance with a first embodiment of the present invention.

Embodiments in accordance with the present invention will be described below referring to the drawings.

EMBODIMENT 1

FIG. 1 is a conceptual view showing a robot in accordance with a first embodiment of the present invention. In FIG. 1, numeral 1 designates a robot. The robot 1 is a horizontal articulated robot being used for semiconductor production and comprises a base section 2, a rotary drum 4 that is axial supported on the base section 2 and rotates around a vertical axis 3, a first arm 5 axial supported on the rotary drum 4, and a second arm 6 axial supported on the first arm 5. Numeral 7 designates a motor disposed inside the base section 2. The power of the motor 7 is transmitted to a drive shaft 12 via a reduction gear 8, a drive pulley 9, a drive belt 10 and a driven pulley 11 to drive the rotary drum 4. Although motors and the like for driving the first arm 5 and the second arm 6 are installed inside the rotary drum 4, they are not shown.

Next, a mechanical stopper for restricting the rotating range of the rotary drum 4 in a range exceeding 360° will be described. In FIG. 1, numeral 21 designates a bracket secured to the base section 2. Two pins 22 and 23 are installed to stand on the bracket 21 with a clearance provided therebetween. Numeral 24 designates a band-shaped elastic member that is layed across between the pin 22 and the pin 23. As the material of the elastic member 24, rubber, plastic or fabric, or a composite material of these can be selected. In addition, a metal plate may also be used if it functions as an elastic member. Numeral 25 is an arm secured to the drive shaft 12, and numeral 26 is a pin that is installed to stand on the arm 25 and functions as the contact piece of the mechanical stopper.

Figure 2A:
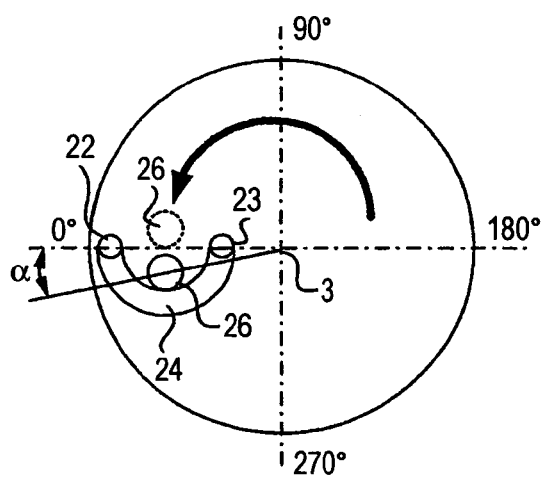
FIGS. 2A and 2B are views illustrating the function of a mechanical stopper in accordance with the present invention.
Figure 2B:
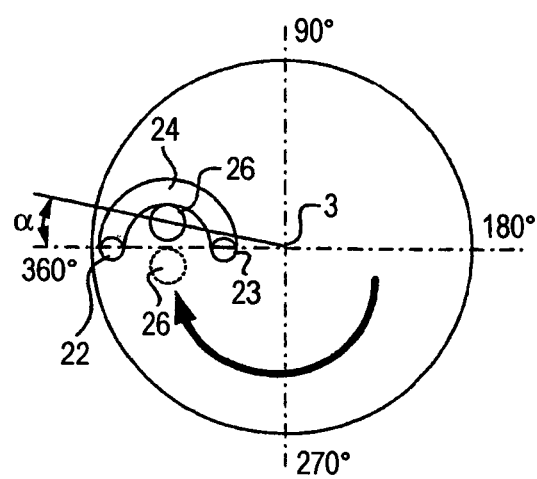

FIG. 2 is a view illustrating the action of the mechanical stopper in accordance with the present invention, corresponding to a view seen from the upper face of the robot 1 shown in FIG. 1. FIG. 2A shows a state wherein the rotary drum 4 rotates counterclockwise and makes contact with the mechanical stopper, and FIG. 2B shows a state wherein the rotary drum 4 rotates clockwise and makes contact with the mechanical stopper. When the rotary drum 4 rotates counterclockwise and when the pin 26 reaches the 0° position, the elastic member 24 is pushed by the pin 26 and bends downward in the figure, whereby the pin 26 advances $\alpha°$ from the 0° position in the negative direction and stops. On the other hand, when the rotary drum 4 rotates clockwise and when the pin 26 reaches the 360° position, the elastic member 24 is pushed by the pin 26 and bends upward in the figure, whereby the pin 26 advances $\alpha°$ from the 360° position in the positive direction and stops. In this way, the rotary drum 4 can rotate in the range of $(360+2\alpha)°$.

EMBODIMENT 2

Figure 3A:
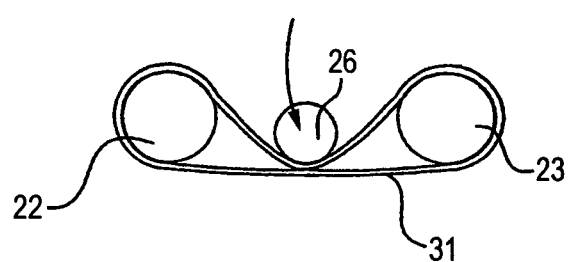
FIGS. 3A and 3B are plan views showing a mechanical stopper in accordance with a second embodiment of the present invention.
Figure 3B:
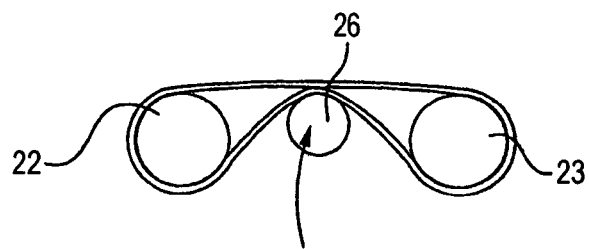

FIG. 3 is a plan view showing a mechanical stopper in accordance with a second embodiment of the present invention. Since the basic configuration is common to that of the first embodiment, only the components required for description are shown. In the figure, numeral 31 designates a timing belt. Although it is a matter of course, the timing belt 31 is originally a kind of an endless belt that is combined with pulleys to transmit power. The timing belt 31 is extended between the pin 22 and the pin 23 in a state of having a predetermined looseness. When the rotary drum 4 rotates counterclockwise and when the pin 26 makes contact with the timing belt 31, the timing belt 31 moves in the direction of being pushed by the pin 26, and a tension is applied thereto. When the looseness of the timing belt 31 is eliminated by the above-mentioned tension, the movement of the timing belt 31 and the pin 26 stops, and the rotation of the rotary drum 4 stops. In a similar way, when the rotary drum 4 rotates clockwise and when the pin 26 makes contact with the timing belt 31, the timing belt 31 moves in the direction of being pushed by the pin 26, and a tension is applied thereto. When the looseness of the timing belt 31 is eliminated by the above-mentioned tension, the movement of the timing belt 31 and the pin 26 stops, and the rotation of the rotary drum 4 stops. In this way, the rotary drum 4 can rotate in a range exceeding 360°.

EMBODIMENT 3

Figure 4:
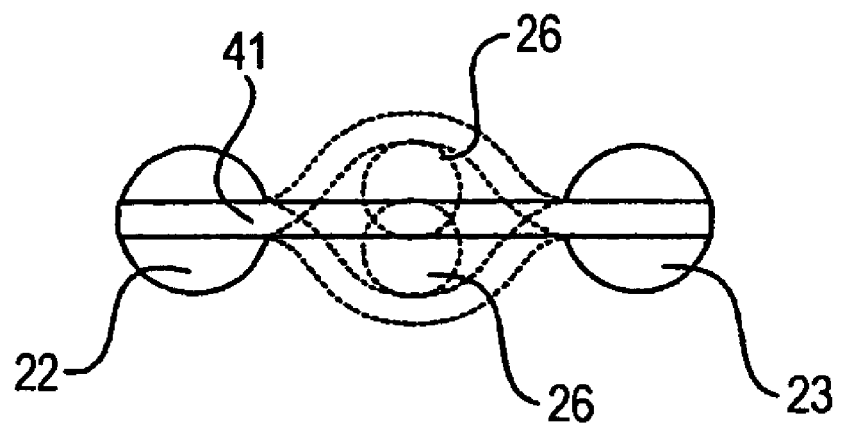
FIG. 4 is a plan view showing a mechanical stopper in accordance with a third embodiment of the present invention.

FIG. 4 is a plan view showing a mechanical stopper in accordance with a third embodiment of the present invention. Since the basic configuration is common to that of the first embodiment, only the components required for description are shown. In the figure, numeral 41 designates a band-shaped rubber plate. As the material of the rubber plate, natural rubber or synthetic rubber or a composite material of these and other materials, such as a material reinforced by the combination of fabric and metallic wires, may also be used. In addition, another synthetic resin may also be selected if it functions in a way similar to the rubber plate. Both ends of the rubber plate 41 are held in grooves formed in the pin 22 and the pin 23, and clamped and secured with screws not shown. When the pin 26 makes contact with the rubber plate 41, the rubber plate 41 is deformed (as indicated using dotted lines in the figure) in the direction of being pushed by the pin 26, whereby the rotary drum 4 can rotate in a range exceeding 360°, as in the above-mentioned Embodiments 1 and 2.

EMBODIMENT 4

Figure 5:
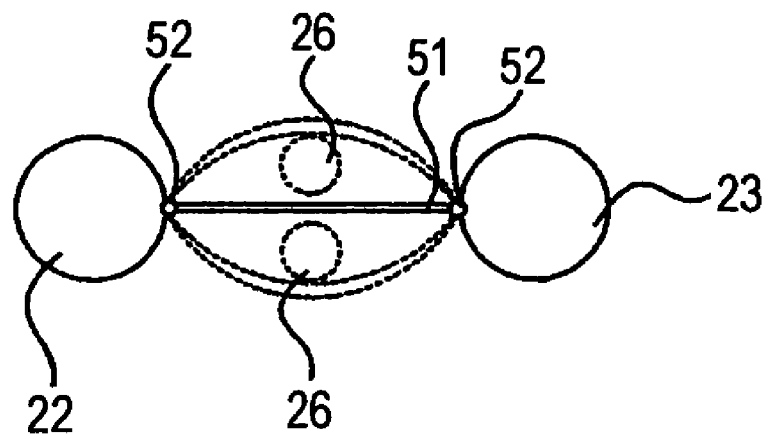
FIG. 5 is a plan view showing a mechanical stopper in accordance with a fourth embodiment of the present invention.

FIG. 5 is a plan view showing a mechanical stopper in accordance with a fourth embodiment of the present invention. Since the basic configuration is common to that of the first embodiment, only the components required for description are shown. In the figure, numeral 51 designates a band-shaped metal plate. The metal plate 51 is a thin plate that is bent easily when subjected to an out-of-plane load. As the material thereof, a material having a required strength should only be selected. In addition, rubber or synthetic resin or a composite material of these or a composite material of these and other materials may also be used instead of the metal plate 51, if it has a similar function. Since both ends of the metal plate 51 are attached to the pin 22 and the pin 23 via hinges 52, they can freely rotate (around the axes perpendicular to the face of the paper). When the pin 26 makes contact with the metal plate 51, the metal plate 51 is deformed in the direction of being pushed by the pin 26, whereby the rotary drum 4 can rotate in a range exceeding 360°, as in the above-mentioned Embodiments 1 to 3.

The present invention is useful as a stopper apparatus, provided in a rotation axis section wherein a relative rotation is carried out between two members around one rotation axis, for restricting the rotation angle of one member with respect to the other member.

Since the contact piece is made contact with the band-shaped elastic member to stop one of the members, the present invention is effective in attaining a mechanical stopper having a simple structure and scarcely generating abrasion powder and the like. In particular, since a commercially available timing belt is used as the above-mentioned band-shaped elastic member in the invention set forth in Aspect 3, the invention is effective in providing a low-priced mechanical stopper.

What is claimed is:

1. A robot equipped with a stopper apparatus comprising:
   a base section;
   a rotary drum which rotates with respect to the base section;
   a first arm rotatably provided on the rotary drum;
   a second arm rotatably provided on a tip end of the first arm;
   a first member which is fixed to the base section,
   two support members provided on the first member with a clearance therebetween,
   an elastic member supported between the two support members,
   a second member relatively rotating with respect to the first member, and
   a contact piece, provided on the second member, for stopping the relative rotation of the second member by making contact with the elastic member,
   wherein the elastic member is deformed in the direction of being pushed by the contact piece so that the second member does not immediately stop rotating.

2. The stopper apparatus as set forth in claim 1, wherein the second member rotates with respect to the first member about a fixed axis.

3. The stopper apparatus as set forth in claim 1, wherein the second member is driven to rotate with respect to the first member by a motor.

* * * * *